United States Patent [19]

Luby

[11] Patent Number: 4,832,146
[45] Date of Patent: May 23, 1989

[54] ANTI-THEFT BATTERY
[76] Inventor: Jeffrey C. Luby, P.O. Box 1940, Easton, Md. 21601
[21] Appl. No.: 117,306
[22] Filed: Nov. 6, 1987
[51] Int. Cl.⁴ .......................................... B60R 25/00
[52] U.S. Cl. .................................. 180/287; 307/10.2
[58] Field of Search .................. 180/287; 307/10 AT, 307/10 BP

[56] References Cited
U.S. PATENT DOCUMENTS 4,673,914  6/1987  Lee ...................................... 180/287
4,682,062  7/1987  Weinberger ........................ 180/287

FOREIGN PATENT DOCUMENTS

85/01708  4/1985  PCT Int'l Appl. ................. 180/287

OTHER PUBLICATIONS

J. C. Whitney & Co. catalog, 1982, p. 184.

Primary Examiner—Charles A. Marmor
Assistant Examiner—Ross Weaver
Attorney, Agent, or Firm—Walter G. Finch

[57] ABSTRACT

An anti-theft device for an automotive vehicle is provided. It is positioned on top of a battery for an automobile or the like which is provided with positive and negative terminals. The anti-theft device is located within a housing having upper and lower sections. The lower section has an opening for receiving the positive pole and a battery clamp.

The anti-theft device receives a positive pole of the battery. The battery clamp fits over the positive pole. The anti-theft device includes a key actuated switch connected by a main power source to a new positive pole. This main power source is switch controlled.

A constant power supply is connected to a resistor and by electrical connections to the key actuated switch through the positive pole of the battery. By timely use of the key actuated switch, the anti-theft device can be turned on and off to secure the automotive vehicle.

6 Claims, 3 Drawing Sheets

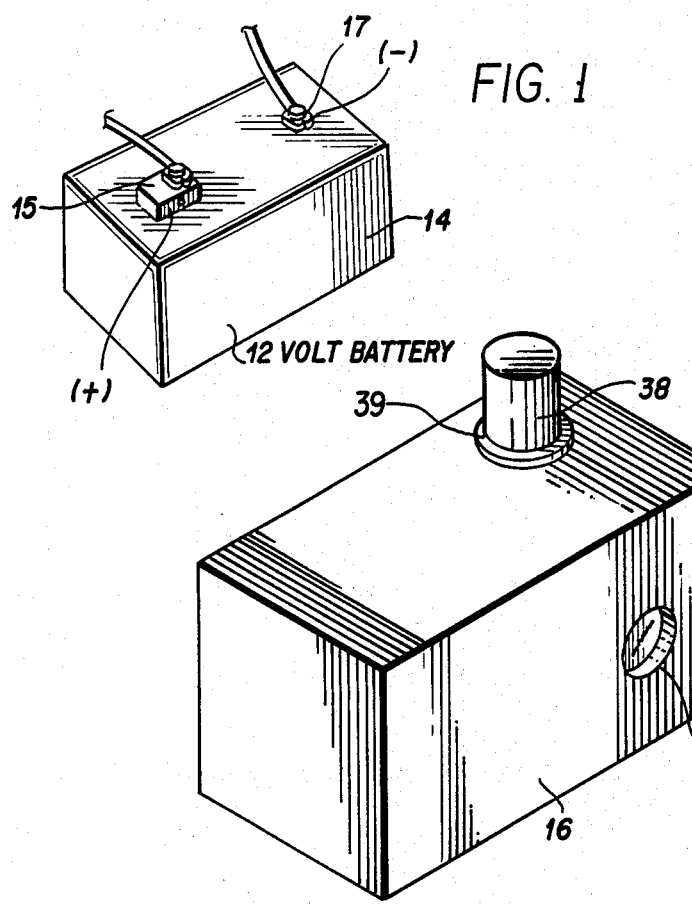
FIG. 1
FIG. 2
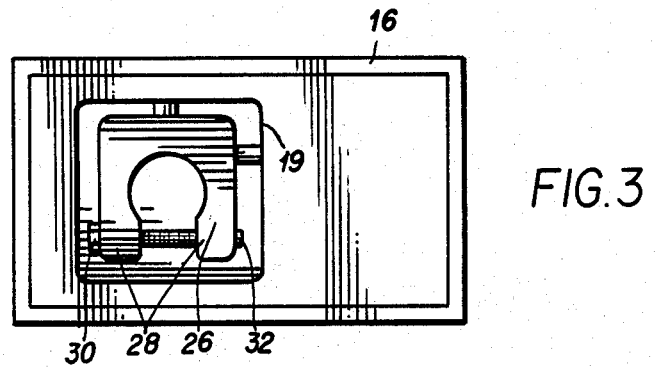
FIG. 3

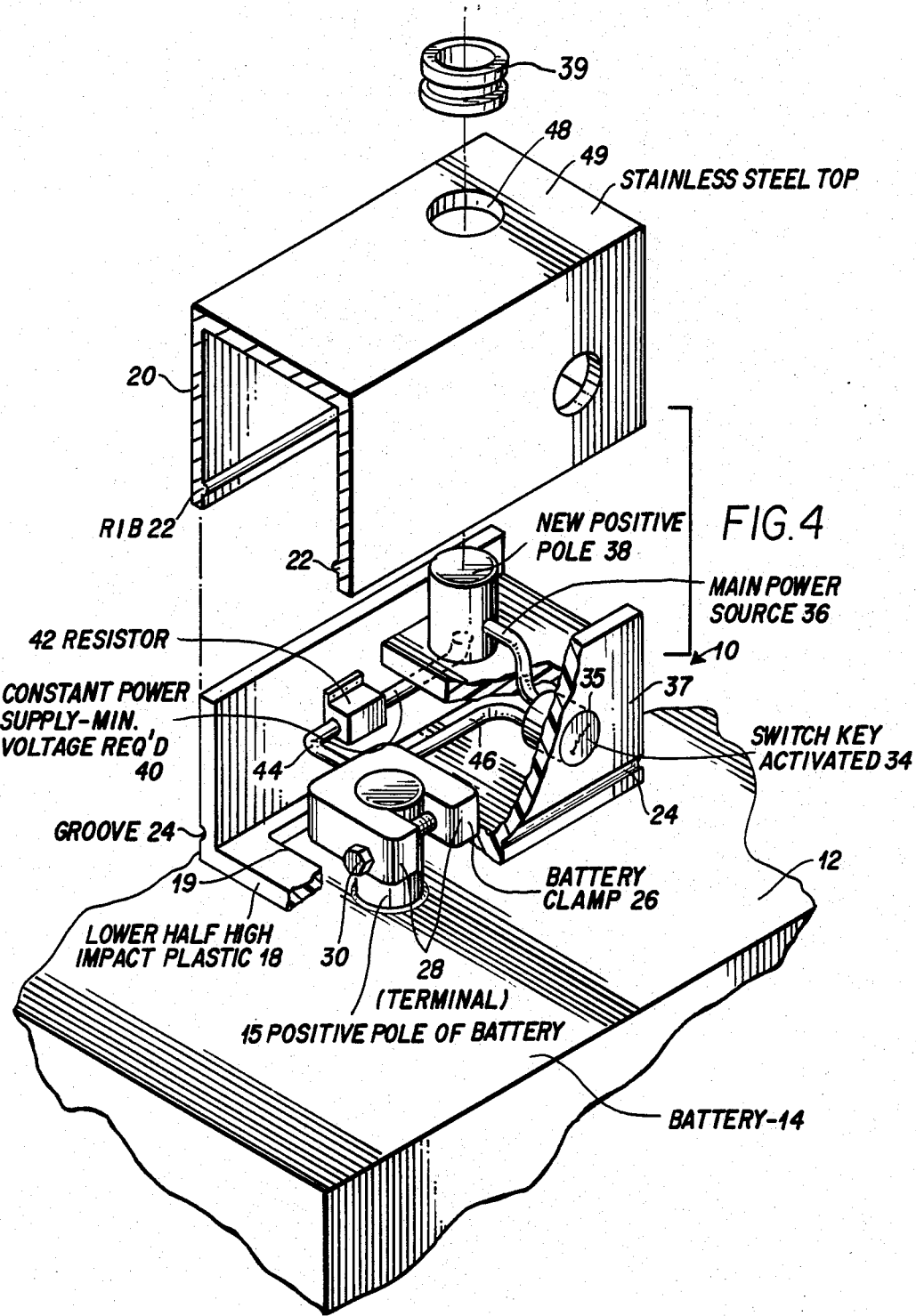

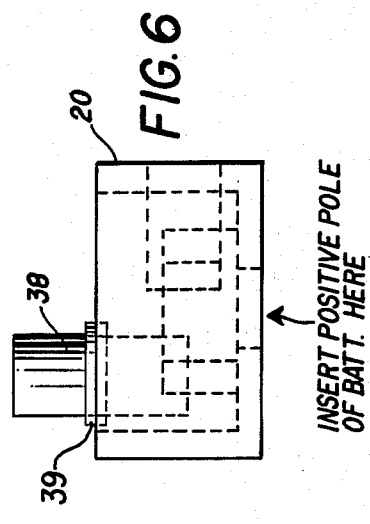
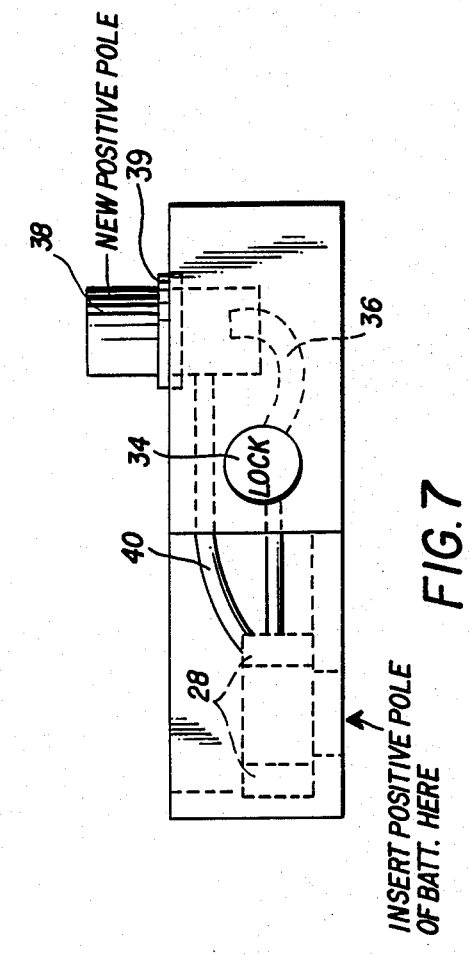
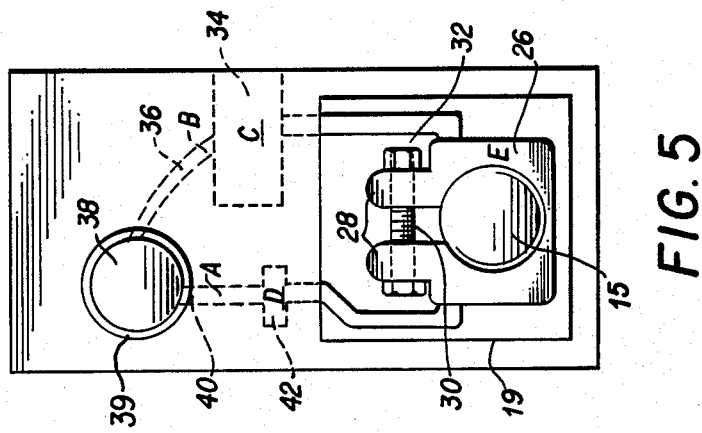

ANTI-THEFT BATTERY

BACKGROUND AND SUMMARY OF THE INVENTION

This invention relates to security devices, and more particularly to devices for preventing theft of automobiles.

It is an object of this invention to provide an anti-theft device in order to prevent the theft of automobiles.

Still another object of this invention is to provide an anti-theft device for a motor and a battery.

And a further object of this invention is to provide an anti-theft device which is simple and efficient in operation and which is economical and feasible in operation.

To provide an anti-theft device which is easy to install, maintain and repair is still another object of this invention.

And even a further object of this invention is to provide a security device for an automobile which is under the control of the operator of the vehicle.

These and other attendant objects and advantages of this invention will become more apparent and obvious from the following detailed drawings.

BRIEF SUMMARY OF THE DRAWINGS

FIG. 1 is a perspective view of a 12 volt battery illustrating the terminals thereof, and which once installed the real positive pole is not accessible to the anti-theft device of this invention;

FIG. 2 shows a side view of the anti-theft device of the invention, showing a new positive pole of the anti-theft device;

FIG. 3 is a bottom plan view of the anti-theft device showing a battery clamp;

FIG. 4 is an exploded perspective view of the anti-theft device comprising this invention;

FIG. 5 is a bottom plan view of the anti-theft device;

FIG. 6 is an end view of the anti-theft device; and

FIG. 7 is a side view of the anti-theft device incorporating features of the invention.

Referring now to FIGS. 1 to 7 of the drawings, there is shown an anti-theft device 10 comprising this invention. The anti-theft device 10 is mounted on the top 12 of a 12 volt battery 14 having two terminals 15 and 17 (positive and negative, respectively). It is located within a housing 16 consisting of a lower case 18 formed of high impact plastic and an upper case 20 formed of stainless steel. The lower case 18 has an opening 19 provided in the plastic base 21 through which the positive pole (or terminal) 15 and the battery clamp 26 pass.

The housing 16, formed of the upper and lower cases 20 and 18, respectively, is held together by the tongues or ribs 22 and the grooves 24. The upper case 20 is slid on the lower case 18. In the aperture in the case 20 for positive pole 38, a non-conductive gasket 39 is provided.

The anti-theft device 10 contained in the housing 16 receives a positive pole 15 of the 12 volt battery 14. A battery clamp 26 fits over the positive pole 15 and the ends 28 are held together around the positive pole 15 by a bolt 30 and nut 32, when the latter are tightened.

As shown in FIG. 4, the anti-theft device 10 includes a key actuated switch 34 connected by a main power source to a new positive pole or terminal 38. This main power source is switch controlled. The key actuated switch 34 is positioned in an aperture 35 in the side wall 37 of the upper case 20.

A constant power supply 40 (with a minimum voltage required) is connected to a resister 42, and by electrical connections 44 and 46 to the key actuated switch 34 through the positive pole 15 of the battery 14. The constant power lead 40 is connected through the key actuated switch 34.

The lower half of the case 18, as previously indicated, is made of high impact plastic, and it is thin enough to allow the positive terminal 15 on the battery 14 to come through to securely attach it.

On the inside of the lower case 18, the battery clamp 26 is provided to secure the anti-theft device 10, the combination key activated switch 34 to cut the power to the engine, with the new positive terminal 38 extending out the top of the upper case 20 through the aperture 48 formed in the upper surface. The bypass lead 40 is provided directly from the covered terminal 15 to the new positive terminal 38 with the resister 42 in the lead which will allow only enough current to pass in order to run the onboard electronics requiring a constant power supply.

Once the lower case 18 is securely mounted on the battery 14, the upper case 20 would be glued and pressed over the bottom case 18 until touching the battery 14. The positive lead is then reconnected to the terminal of the anti-theft device 10.

In operation, with the anti-theft device 10 installed, the key is for the key activated switch 34 used to turn the key activated switch 34 to the off position. This action effectively disconnects the positive terminal 15 of the battery 14. Now, not even a jump start will run or stall the engine of the automobiles as the connections are not correct for the proper current flow. To start the engine, the switch of the key activated switch 34 is turned to the on position and power is then restored.

This anti-theft device 10 can either be an aftermarket addition to a battery as well as a permanent part added in manufacturing. Also, if desired, the anti-theft device 10 can easily be adapted to remote control.

What is claimed is:

1. An anti-theft device for an automobile, comprising, a battery having positive and negative terminals, a housing having an opening positioned on top of said battery so that said positive terminal passes through said opening, clamping means for holding said positive terminal in a fixed position in inside said housing, said positive terminal providing a constant power supply, a second positive terminal extending from said housing, a key actuated switch means positioned in said housing and connected between said constant power supply and said second positive terminal, and a resistor means, connected to said second positive terminal and said constant power supply.

2. An anti-theft device for an automobile, as recited in claim 1, wherein said housing is formed of two slidable sections.

3. An anti-theft device for an automobile as recited in claim 1, wherein said clamping means is of substantially U-shape.

4. An anti-theft device for an automobile as recited in claim 1, wherein said battery generates 12 volts.

5. An anti-theft device for use with an automobile as recited in claim 1, wherein the lower section of said housing is formed of high impact plastic.

6. An anti-theft device for use with an automobile, as recited in claim 1, wherein said upper section of said housing is formed of stainless steel.

* * * * *